United States Patent [19]
Chen et al.

[11] Patent Number: 6,005,377
[45] Date of Patent: Dec. 21, 1999

[54] PROGRAMMABLE DIGITAL CONTROLLER FOR SWITCH MODE POWER CONVERSION AND POWER SUPPLY EMPLOYING THE SAME

[75] Inventors: Qing Chen, Plano, Tex.; Anatoly Feygenson, Hillsboro, N.J.; Ashraf Wagih Lotfi, Rowlett; Kenneth John Timm, Rockwall, both of Tex.

[73] Assignee: Lucent Technologies Inc., Murray Hill, N.J.

[21] Appl. No.: 08/932,263

[22] Filed: Sep. 17, 1997

[51] Int. Cl.$^6$ .............................. G05F 1/40; G05F 1/575
[52] U.S. Cl. ............................................. 323/283; 323/223
[58] Field of Search .................................. 323/283, 282; 33/179.5 R, 222, 223

[56] References Cited

U.S. PATENT DOCUMENTS

| | | | |
|---|---|---|---|
| 4,704,799 | 11/1987 | Kobetsky | 33/179.5 R |
| 5,475,296 | 12/1995 | Vinsant et al. | 323/223 |
| 5,594,324 | 1/1997 | Canter et al. | 323/282 |
| 5,610,507 | 3/1997 | Brittan | 323/350 |
| 5,631,550 | 5/1997 | Castro et al. | 323/283 |

*Primary Examiner*—Peter S. Wong
*Assistant Examiner*—Rajnikant B. Patel

[57] ABSTRACT

A programmable controller for switch-mode power converters that operates in a digital domain without reliance on operation software and the ability to vastly reduce or eliminate analog circuitry. The digital controller is re-programmable. In one embodiment, the substantially digital portion of the controller is a Field Programmable Gate Array that controls operation of the converter by generally converting an analog reference signal(s) (e.g. the voltage output) into the digital domain. The controller then can perform distributed arithmetic to generate a square wave signal capable of controlling at least a main switch of the converter. The present invention can, if desired, essentially eliminate analog controllers in power conversion systems such as switch-mode converters.

15 Claims, 3 Drawing Sheets

PROGRAMMABLE DIGITAL CONTROLLER FOR SWITCH MODE POWER CONVERSION AND POWER SUPPLY EMPLOYING THE SAME

FIELD OF THE INVENTION

The present invention relates generally to power conversion, and more specifically, to a programmable digital controller for power factor correction in switch-mode power converters, a method of operating such converters and a power supply employing the converter.

BACKGROUND OF THE INVENTION

A switch-mode power converter is a power processing device that converts an input voltage or current source waveform into a specified output voltage or current waveform. Fundamental to the operation of switch-mode converters are controllers, which manage the operation of the converter by controlling the on and off periods of switches employed therein. Generally, controllers are coupled between the output and input of the converter in a feedback loop configuration (also referred to as a control loop or closed-control loop). Typically, the controller measures an energy level at the output (e.g., power, voltage, current, etc.) and based on the quantity of the output, dynamically increases or decreases switch on-time in the converter to maintain a constant output to a load.

Today, controllers in switch-mode power converters are primarily composed of interconnected analog circuits. Analog circuitry is undesirable for numerous reasons, for example: (1) Each controller requires hundreds of interconnected discrete components to obtain the desired functionality of a single controller. Hundreds of discrete components translates into large inventory costs, complicated and expensive manufacturing processes. (2) Analog controllers tend to require a fairly extensive area of power supplies to account for numerous discrete components comprising the controller, which is a disadvantage in today's power system industry where there is an ever increasing desire to minimize the size of power supplies. (3) Analog hardware is generally fixed and inflexible. Modifications to analog hardware controllers typically require a complete redesign of the entire controller. (4) Analog circuitry is subject to packaging and component defects especially as the number of components increases. (6) Analog circuitry is sensitive to noise.

As is evident from the foregoing, there are many problems associated with analog control circuits used in switch-mode power converters. Despite the numerous limitations of analog circuitry, however, it remains the choice for use in a majority of commercially manufactured switch-mode converters today, because there are no suitable technology design alternatives available for switched-mode converters.

Digital controllers have been successfully employed in place of analog controllers in slower power system designs such as Uninteruptable Power Supplies (UPSs), motor drives and three-phase rectifiers, which typically require response times in the range of 10-to-500 Hz or two-to-six milli seconds. In such devices, microprocessors and digital signal processors (DSPs) are typically able to execute commands in an allotted amount of time consistent with controlling the power system.

Nevertheless, microprocessors and DSPs are not viable alternatives to analog controllers for use with switch-mode converters today. For instance, microprocessors and DSPs are generally not capable of delivering required speeds and bandwidths as analog converters. A typical commercial AC-to-DC or DC-to-DC switch mode converter requires a response time of approximately 20 μs and bandwidth requirements in the range of 5 kHz-to-100 kHz. Controllers for switch-mode converters must account for sampling within a switching cycle, which is two orders of magnitude faster than slower power system designs mentioned above. Such response times are easily obtained by analog circuitry. Microprocessors and Digital Signal Processor (DSPs), are generally not capable of matching the wide bandwidth requirements in their control loops to meet the fast transient requirements and high switching frequencies of such switch-mode converters.

Moreover, overcoming these limitations would require employing cost prohibitive processor schemes, when compared to the cost of analog controllers used today. For instance, a 60 watt DC-to-DC converter with analog control circuitry may cost around a $100 U.S. dollars, whereas the cost of a DSP alone may cost around $150.00 U.S. dollars. High performance DSPs are simply too expensive for use with switch-mode power converters when compared to low cost items like analog controllers for use with such controllers.

Attempts have been made to employ Application Specific Integrated Circuits (ASICs) as a digital alternative to analog circuitry in the control loop of switch-mode converters. ASICs provide parallel and pipelined processing which boosts speed considerably. When applied in a high volume product, an ASIC is also cost-effective. Nevertheless, ASICs, like analog circuitry, lack flexibility, since they are not re-programmable and are generally fixed designs. Once an ASIC controller design is fabricated, it is extremely difficult to reconfigure. Furthermore, ASICs do not lend themselves to lower volume products in terms of cost benefits and require considerable expense and effort to design and build.

The vast majority of commercial switch-mode power supplies available today still employ conventional analog circuitry in their control loops. Accordingly, what is needed is a cost effective and flexible digital alternative to conventional analog control circuitry in switch-mode converters.

SUMMARY OF THE INVENTION

The present invention is directed to a programmable digital controller for power converters. In one embodiment the power converter includes a power train with at least one switch. A programmable digital controller, is coupled to the power train. The controller is configured to operate in a digital domain without reliance on operational software, to control the switch.

In an exemplary embodiment, the controller is a Field Programmable Gate Array (FPGA) with the ability to handle numerous functions simultaneously and in parallel, as opposed to a DSP which handles instructions serially. Thus, the controllers of the present invention can handle bandwidths greater than or equivalent to analog controllers, in the range of 5 kHz-to-100 kHz.

The present invention can, if desired, essentially eliminate analog controllers in power conversion systems such as switch-mode converters.

The controller of the present invention can be implemented as one integrated circuit chip (one component) replacing large amounts of discrete components needed in analog controllers. Accordingly, the present invention saves real-estate, reduces mounting costs and printed wiring expenses.

The programmable controller of the present invention can be manufactured in high volume, reducing cost, since each user can select a unique configuration to run on a standard controller. The configuration of a single controller can be changed repeatedly, allowing for minor or even total revisions and specification changes of power supplies.

Other advantages of a configurable, standard controller are: faster time to implement a specification and deliver functional converters to market, easy design modifications and faster delivery of new converters. The programmable nature of the digital controller also allows finished, commercial converters to be revised in the field to incorporate improvements or enhancements. Thus, by being digital and re-configurable, the controller can be reprogrammed on the fly to tailor transfer functions associated with RC coefficients. Whereas, analog circuits must be redesigned, typically anew.

Still another feature of the present invention is by being a hermetically sealed integrated package as opposed to analog components reliability of power supplies will increase.

A further advantage of the present invention, is the controller, by being digital, is immune to noise, as opposed to analog controllers, which are noise sensitive Other embodiments, features and advantages of the present invention will become apparent after reading the foregoing description.

DETAILED DESCRIPTION OF THE INVENTION

The present invention is directed to a programmable controller for switch-mode power converters that operates in a digital domain without reliance on operation software and the ability to vastly reduce or eliminate analog circuitry. For a more complete understanding of the present invention, reference is initially made to FIG. 1, which is a simplified block diagram a switch-mode power converter 100 including a power train 101 managed by a programmable digital controller 102, according to the principles of the present invention.

Figure 1:
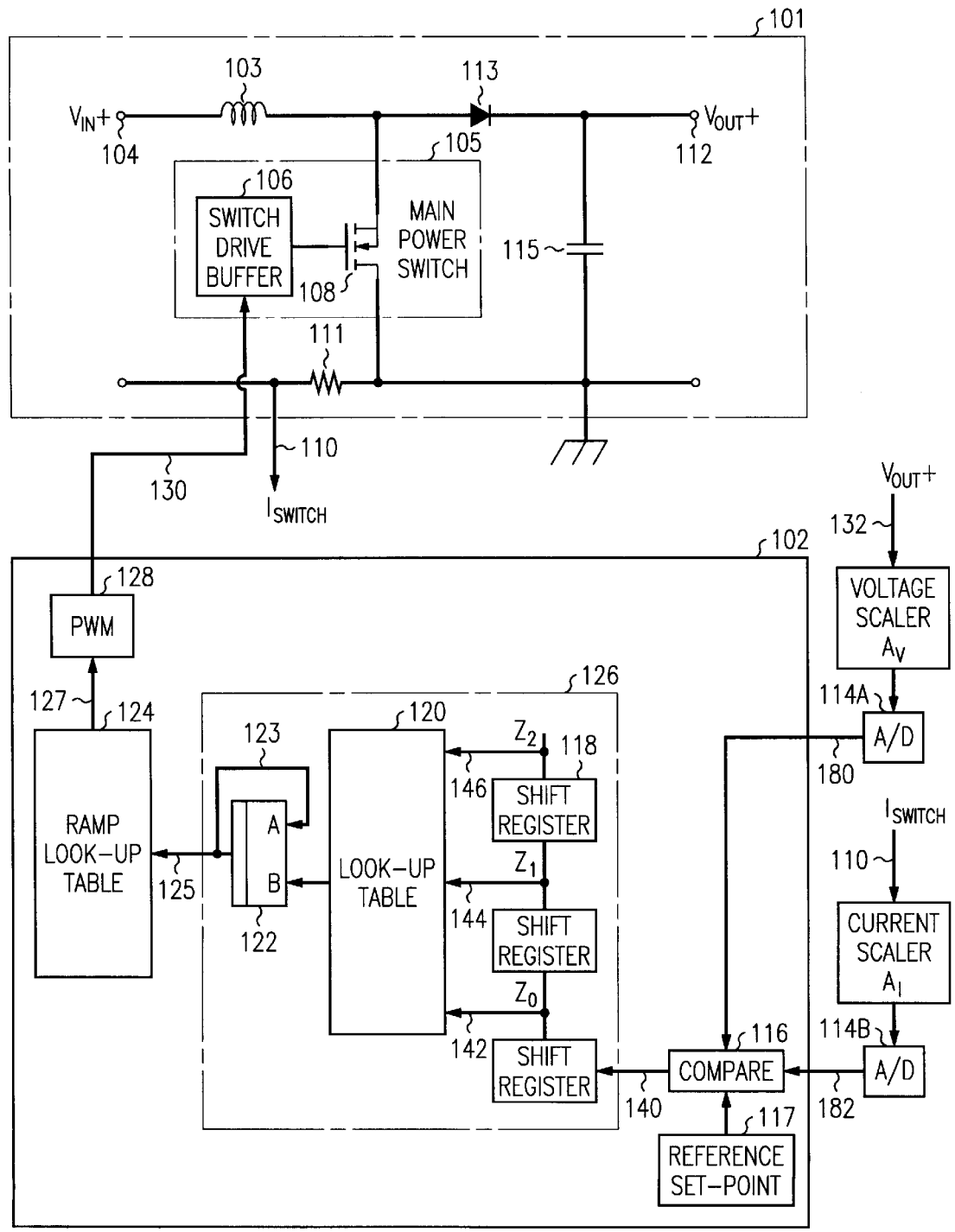
FIG. 1 is a simplified block diagram a switch-mode power converter 100 including a power train 101 managed by a programmable digital controller 102, according to the principles of the present invention.

Power converter 100 may be any type of switch-mode converter that traditionally employs analog control circuitry. For purposes of illustration, the switch-mode power converter 100 of FIG. 1 is shown as a DC-to-DC converter employing a power train 101 configured in a boost topology with power factor correction. Power train 101 includes input terminals 104, an inductor 103, a switching stage 105 (having a switch drive buffer 106 and main power switch 108), a resistor 111 in series with one of the input lines, a rectifier 113, an output capacitor 115, and output terminals 112 $V_{OUT}$. The operation and structure of power train 101 is well understood by those skilled in the art.

Of course, it is envisioned that a wide range of other power train topologies may be substituted for converter 100 without departing from the scope of the present invention (including, but not limited to AC-to-DC power conversion, forward, flyback, buck, buck-boost, push-push, push-pull, Weinberg, split-boost, multiple transformers, half and full bridge topologies, and so forth.). Generally, as long as the converter 100 includes one or more switches, it may be substituted for the topology of power train 101. For example, other switching topologies, including but not limited to, hard-switched pulse width modulation (PWM), soft-switched zero-voltage-switching PWM, zero-current-switching, resonant converters with variable frequency, or constant on-or off-times and numerous other switching topologies may be substituted for power train 101.

The power train 101 is controlled by the controller 102. The controller 102 may be any programmable digital device that does not rely on operational software to function. In other words, unlike DSPs where the architecture requires tasks to be implemented in software executed by a processor, the controller 102 of the present invention employs distributed arithmetic which makes use of look-up tables and parallel structures without using a dedicated multiplier block, thereby surpassing the performance of a DSP. Accordingly controller 102 may be any digital logic device that can easily be configured or re-configured, e.g., the same device may be programmed many times to perform a desired logic operation or calculation that would be required of several different analog controllers.

Although, the digital controller 102 may incorporate limited analog circuitry without departing from the scope of the present invention, in the preferred exemplary embodiment the controller 102 is a fully digital Field Programmable Gate Array (FPGA) embodied on a single chip. FPGAs (and related programmable logic devices) offer low levels of costs in terms of programmability and ability to allow complete dynamic re-configurablity, something that analog devices and ASICs cannot provide. FPGAs can be configured in a short amount of time and provide faster performance than a general purpose computers, microcontrollers and DSPs, although generally not as fast as an ASIC, and are available at moderate cost. FPGAs can be manufactured in high volume, reducing cost, since each power controller user can select a unique configuration to run on the standard FPGA controller. The configuration of a single controller can be changed repeatedly, allowing for minor or even total revisions and specification changes. Other advantages of a configurable, standard part are: faster time implement a specification and deliver a functional unit to market, lower inventory risks, easy design changes, faster delivery, and availability of second sources. The programmable nature of the FPGA controller allows a finished, commercial product to be revised in the field to incorporate improvements or enhancements to the specification or finished product. Furthermore, commercially available hardware description languages can be used to design or configure FPGA controllers, such as HDL and ABLE.

The bandwidth requirement for current switch-mode power supplies (AC-to-DC and DC-to-DC) is conservatively 5 kHz-to-50 kHZ and is expected increase as faster switching power supplies emerge. An FPGA controller is capable of controlling power trans switching at over 10 MHz, well beyond today's typical switching frequencies of 1 MHz. FPGA-based controllers 102 are able to offer high execution speed by implementing time consuming arithmetic operations through distributed arithmetic (DA) techniques, such as using look-up tables and parallel structures, typically without a dedicated multiplier bloc. Thus, the design of a digital controller 102 according to the present invention is based on a digital circuit implementation, which is in sharp contrast with DSPs where the functionality is derived from an algorithm implemented in operational software executed by the DSP.

It is possible that the controller 102 can be connected to a larger bussing scheme connecting the converter 100 to other controllers or monitoring devices such as a processor in a larger system. For example, in large multi-power supply systems, the controller 102 is capable of communicating with central controllers (not shown) that oversee operation of the system. In the past, such central controllers were not capable of addressing internal functions of the power supplies in the system. With an FPGA digital controller within each power unit or converter 100, the converter 100 can relay its status to the central controller and receive commands to modify switching frequency, change duty cycle, change set-point, modify dynamic response, etc. Conventional analog controllers are simply not capable of operating with such flexibility. As is apparent the controller 102 can also be configured to perform a series of other operations and is not limited to controlling the power train 101.

Although it is possible to add some analog circuitry to the controller 102 without departing from the scope and spirit of the present invention, it is preferred to limit analog circuitry to a minimum to avoid limitations associated with analog circuitry as described above.

Referring to an example embodiment shown in FIG. 1, the controller 102 includes two input terminals 180, 182 and an output terminal 130. The input terminals 180, 182 are connected to analog-to-digital (A/D) converters 114A, 114B, respectively. A/D converter 114A is connected to $V_{OUT}$ 112 via line 132 and A/D converter 114 is connected to the main switch via line 110. A/D converter 114A converts the analog voltage $V_{OUT}$ to a digital signal and A/D converter 114B converts the current, $I_{SWITCH}$, in the main switch 108 to a digital signal. Although, converters 114 are shown off-chip, they could easily be located on the controller 102 chip. The controller 102, based on the sensed signals, $V_{OUT}$ and $I_{SWITCH}$, sends a feedback control signal (square wave signal) via terminal line 130, which controls the switching frequency of the main power switch 108 via switch drive buffer 106. The buffer 106 is necessary to provide enough current to activate the gate of the switch 108, if the signal is too small. It is very possible, that the power train 101 and controller 102 can be coupled together in other ways with either more or less sense/feedback lines and in other control topologies.

The controller 102 also includes: a compare function 116, a reference set-point register 117, a shift register 118, a look-up table 120, an accumulator 122, a ramp look-up table 124, and a pulse width modulator (PWM) 128. Desired filter characteristics matching the desired operational characteristics of a particular power train 101 are typically generated off-line by calculating appropriate transfer functions and filter responses. After the information is generated, it is loaded into the tables and registers of the controller 102 in accordance with conventional FPGA programming techniques well understood by those familiar with FPGAs. It should be noted that the shift register 118, look-up table 120 and accumulator 122 form a distributed arithmetic unit, denoted 126, wherein "distributed arithmetic" associated with the controller is performed.

Figure 2:
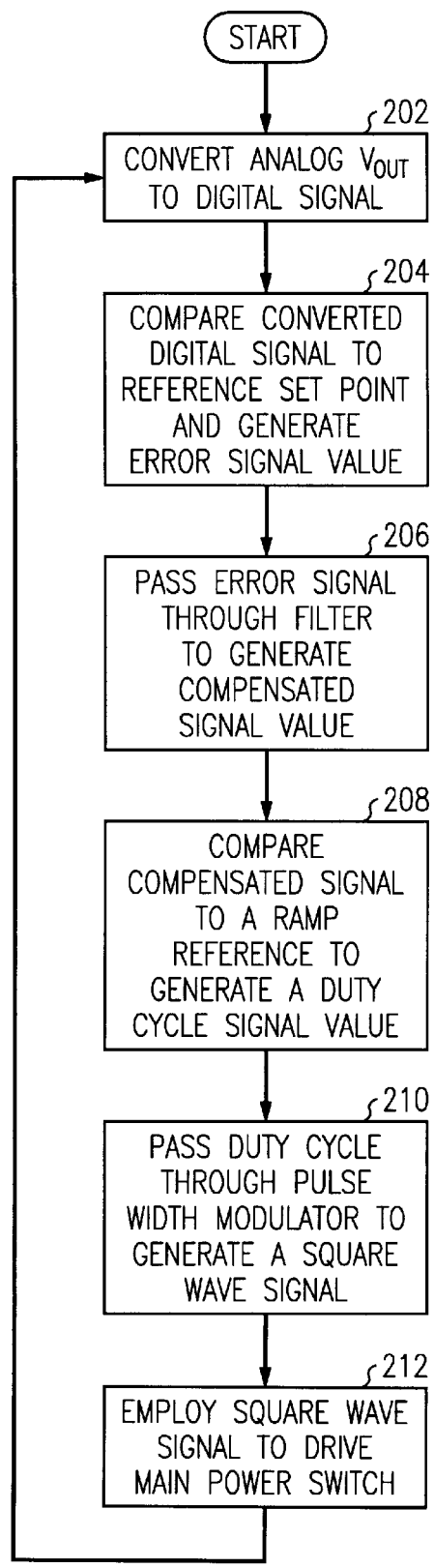
FIG. 2 is flow chart illustrating the operational steps associated with controlling the power train 101 of converter 100, according to the principles of the present invention.

FIG. 2 is flow chart illustrating the operational steps associated with controlling the power train 101 of converter 100, according to the principles of the present invention. It is assumed for purposes of this discussion that the FPGA has been pre-programmed. Referring to FIGS. 1 and 2, in step 202 the voltages $V_{OUT}$ and $I_{SWITCH}$ are converted into a digital signal via the A/D converters 114. In step 204, the comparator 116 compares the digital signals to a reference set point (REF) stored in the reference set point register 117 and generates an error signal. The reference set-points (pre-determined) which are stored in the register 117 generates the error signal, E, in accordance with equation (1.0):

$$E = k(A_V V_{OUT} + A_I I_{SWITCH}) - REF \qquad \text{(eq. 1.0)}$$

where k is a scaling factor constant.

In step 206, the error signal, E, is applied to the shift register 118 via line 140 to create a digital word, which is applied via lines 142–146 to the look-up table 120. The look-up table 120 contains pre-stored coefficients in the digital domain. All desired analog filter transfer functions g(s) are converted to discrete digital form G(z) and are pre-loaded into the look-up table 120. Thus, the filter response can be expressed as a digital polynomial:

$$G(z) = C_0 + C_1 Z^{-1} + C_2 Z^{-2} + \ldots + C_n Z^{-n} \qquad \text{(eq. 2.0)}$$

where $Z^{-1}$ is a delayed sample i clock cycles and the coefficients $C_i$ determine the desired filter response. In other words, the error signal must be compensated to produce the desired dynamic response. Typically, the filter response is know in the s-domain through a Laplace transfer function g(s). The function g(s) is then transferred to the Z-domain yielding G(z) with coefficients shown above. The digital filter G(Z) is implemented in the chip as through distributed arithmetic and is denoted as the distributed arithmetic unit 126. The look-up table 120 contains coefficients C. An equivalent to a multiply operation is performed by applying contents of the shift register Z to the look-up table 120, then comparing the partial sums A, B using the accumulator 122 with feedback 123 from the output 125. Thus, a compensated signal (a value) is generated from the output 125 of the accumulator 122 and applied to the ramp look-up table 124.

In a step 208, the compensated signal value is compared to a corresponding ramp reference stored in the ramp look-up table 124 to generate a duty cycle signal value. In other words, once the compensated signal is generated, the value of the duty cycle (i.e., a digital word representing a number between minimum and maximum duty cycle) is generated. This is performed by comparing the compensated error signal with a ramp reference (predetermined and stored as a reference).

Next, in step 210, the digital value of the duty cycle is fed via 127 as an input to the PWM generator 128, which in turn generates a square wave signal with a desired duty cycle at a desired frequency. As shown in step 212, the square wave signal is used to drive the main power switch 108.

Figure 3:
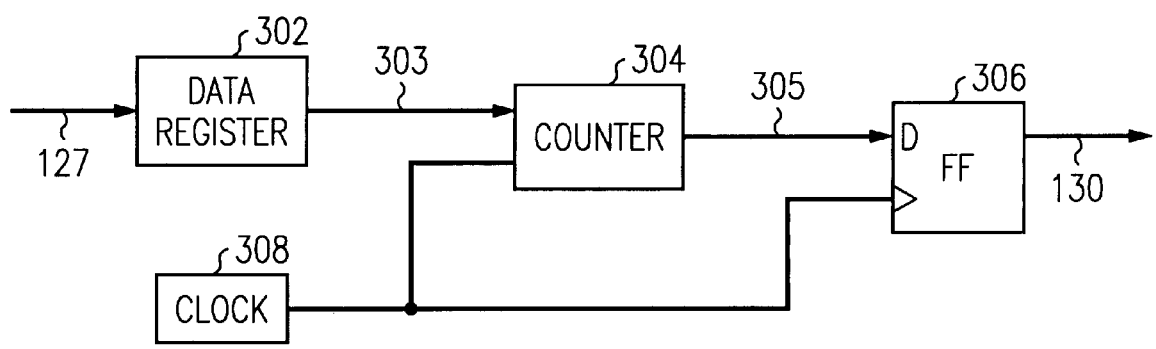
FIG. 3 is a simplified block diagram of a example PWM generator 128 according to the general principles of the present invention.

FIG. 3 is a simplified block diagram of a example PWM generator 128 according to the general principles of the present invention. The generator 128 generally includes a data register 302, an up-down counter 304, a flip-flop 306, and a clock 308. When the digital value of the duty cycle is fed into the PWM generator 128 via line 127 it is captured in the data register 302. The value is then fed to the counter 304 via line 303, and used as a terminating point for counter 304. Accordingly, an up-counter termination signal is sent to the flip-flop 306, resulting in a signal (not shown) whose on-time is equal in length to the value initially stored in the date register 302, which is the desired duty cycle. Thus, at the end of the cycle, the counter 304 is reset and the flip-flop 306 will go inactive (or changes state) until the end of the entire cycle period, N bits.

While preferred embodiments have been set forth, various modifications, alterations, and changes may be made without departing from the spirit and scope of the present invention as defined in the specification and in the appended claims.

What is claimed is:

1. A power converter having a power train with at least one switch, comprising:
   a programmable digital controller, coupled to said power train, configured to operate in a digital domain without reliance on operational software or internal analog circuitry, to control said switch.

2. The power converter of claim 1, wherein said power converter is part of an AC-to-DC power supply.

3. The power converter of claim 1, wherein said programmable digital controller is a Field-Programmable-Gate-Array.

4. The power converter of claim 1, wherein said power converter includes an output voltage.

5. The power converter of claim 4, wherein said programmable digital controller includes means for comparing said output voltage to a reference level and for generating an error signal indicating the difference between said output voltage and said reference level.

6. The power converter of claim 5, wherein said programmable digital controller generates a switching signal as function of said error signal to optimally control when said switch is opened and closed.

7. The power converter of claim 1, wherein said power converter is part of a DC-to-DC power supply.

8. An apparatus, comprising:
   a substantially digital controller configurable to regulate an operation of a switch-mode power converter without reliance on operational software or internal analog circuitry.

9. The apparatus of claim 8, wherein said substantially digital controller is a field programmable gate array.

10. The apparatus of claim 8, wherein said switch-mode converter produces an output voltage and said substantially digital controller includes a means for comparing said output voltage to a reference level and for generating an error signal indicating a difference between said output voltage and said reference level.

11. The apparatus of claim 10, wherein said substantially digital controller generates a switching signal as a function of said error signal to optimally control said switch-mode converter.

12. The apparatus of claim 8, wherein said substantially digital controller is re-configurable.

13. The apparatus of claim 8, wherein said apparatus is a power supply.

14. A method of controlling a power train of a switch-mode converter, comprising:
   (a) converting a voltage output of said power train into a digital signal;
   (b) comparing said digital signal to a stored reference set point to generate an error signal value;
   (c) applying said error signal value to a distributed arithmetic unit to generate a compensated signal value;
   (d) comparing said compensated signal value to a ramp reference stored in a table to generate a duty cycle signal value;
   (e) passing said duty cycle signal value through a pulse width modulator to generate a square wave signal; and
   (f) employing said square wave signal to drive a main power switch of said power train.

15. The method of claim 14, wherein said applying said error signal value a distributed arithmetic unit converts said value from a G(s) domain into a G(Z) domain.

* * * * *